Patented May 14, 1929.

1,712,968

UNITED STATES PATENT OFFICE.

HAROLD P. ROBERTS AND HARRY A. MERKLE, OF NITRO, WEST VIRGINIA, ASSIGNORS TO THE RUBBER SERVICE LABORATORIES CO., OF AKRON, OHIO, A CORPORATION OF OHIO.

MANUFACTURE OF ARYL THIAZOLE COMPOUNDS.

No Drawing.   Application filed August 13, 1926. Serial No. 129,092.

Our present invention is directed to the art of manufacturing aryl-thiazole compounds by a new process whereby high yields of the desired compounds, are realized. The process is particularly applicable to the manufacture of aryl-thiazole compounds from aromatic substituted thio-ureas as is hereinafter fully set forth and described.

Mercapto-benzo-thiazole has been described as the reaction product formed by the interaction of diphenyl-thiourea and sulfur, when heated together at comparatively high temperatures. The yield of mercapto-benzo-thiazole by this process, however, is very low, being in general about 50%, and frequently less, of the yield theoretically possible from the quantities of ingredients employed. The principal product of such a reaction usually comprises sticky, tarry, sulfurized reaction products of variable composition depending upon the reaction temperature, the time of heating and other reacting conditions employed. Moreover, in such a process, aniline splits off as one of the many by-products of the reaction and this requires that the reaction product be purified by distillation methods to separate the aniline from the main product. The residual material, that is, the non-gaseous reaction product however, always contains a predominating proportion of other and higher sulfurized products than mercapto-benzo-thiazole.

It has furthermore been proposed that mercapto-benzo-thiazole may be prepared by heating thio-carbanilide and sulfur for several hours in the presence of a solvent, such as aniline. This process is likewise objectionable in that the yields realized thereby are relatively low, the control of the reaction is difficult, the process is unnecessarily complicated and the product obtained is a mixture of many undesirable components of a tarry nature.

The disadvantages of the older processes are avoided and high yields of a much purer product may be obtained by employing our new and improved process which is illustrated by the following example. According to our preferred process, an aromatic thiourea is reacted with carbon bisulfid and sulfur under such pressure and temperature conditions that there results an exceptionally high yield of the compound desired. The probable reaction taking place is as follows:

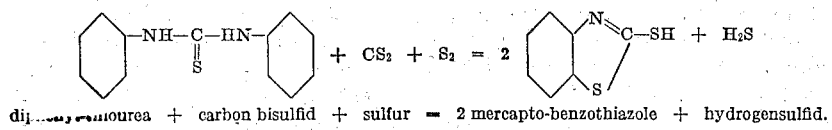

diphenylthiourea + carbon bisulfid + sulfur = 2 mercapto-benzothiazole + hydrogensulfid.

The above reaction is most readily carried out by charging a suitable reaction chamber, preferably a cool or comparatively cold autoclave, with approximately 228 parts (one molecular proportion) of diphenyl-thiourea to which are added substantially 64 parts of sulfur (one molecular proportion) and approximately 80 parts (a slight excess over one molecular proportion) of carbon bisulfid. It is, of course, apparent that the exact proportions of the interacting ingredients as indicated need not necessarily be taken but that any multiple of the quantities of substances mentioned may be employed, if desired. It is desirable to employ as high quality materials as are commercially available for this process and we have found that a thiocarbanilide possessing a melting point of from 147–150° C. gives excellent results.

The autoclave, which is supplied with the usual temperature and pressure recording means is then tightly closed and is slowly heated by any means, such as by a gas flame directly applied which is adjusted so that the temperature of the contents of the autoclave increases at the rate of approximately one degree per minute. This rate of heating is continued until the thermometer indicates a temperature of 225° C. whereupon the heat is moderated so that the temperature rise is about one degree every two minutes, and this rate is continued until the temperature of the contents of the autoclave has reached 275° C or thereabout. The time required for attaining the temperature mentioned under the conditions specified is approximately from five to six hours.

As the temperature of the mass within the autoclave is increased, a pressure develops and builds up within the system due to the vaporization of a portion of the ingredients and to the production of gaseous reaction products as shown by the equation hereinbefore given. The greater part of the increase in pressure takes place after the temperature of the interacting mass has reached 240° C., although a very appreciable pressure is ordinarily built up before this temperature is reached. As the temperature continues to increase, the pressure likewise tends to increase, until a maximum reaction pressure is developed. When this point is reached, the pressure suddenly drops off by as much as 30 to 40 pounds per square inch even though the temperature within the autoclave may still be rising. Following this drop in pressure, the pressure remains substantially constant. Although this decrease in pressure indicates that the reaction proceeding within the autoclave is complete, we prefer to maintain the temperature of the mass substantially at its highest point for approximately a half hour following the drop in pressure in order to make certain of the completion of the reaction and to obtain a uniform reaction product.

After the reaction has been completed in the manner indicated, the heating of the autoclave is discontinued, vent valves are first cracked and then slowly opened to permit gases to escape and the pressure is gradually diminished until excess pressure is removed from the system, whereupon the finished reaction product is withdrawn from the autoclave. For most uses, the reaction product is sufficiently pure as to require no further treatment. It may, however, be readily purified, if desired, by dissolving the product in a suitable base, for example, caustic soda and then neutralizing the alkaline solution by means of any suitable mineral acid, such as sulfuric acid. The product, mercapto-benzo-thiazole is thereby precipitated and can be filtered and dried.

Although the example has specified the use of but one thio-urea, it is apparent that our process is adaptable to the manufacture of other aryl-thiazole compounds by using various aromatic thio-ureas or substituted thio-ureas. Thus, for example, the thio-ureas obtainable from the action of carbon bisulfid upon the xylidenes, the toluidines and other primary aromatic amines may be employed in equimolecular proportions in the place of thiocarbanilide specifically mentioned in the example given. Our process is likewise, particularly applicable to the manufacture of the sulfur reaction products of the so-called nitrogenous rubber vulcanization accelerators, that is, to the production of the sulfur reaction products of those recognized vulcanization accelerators containing nitrogen in their composition.

Our invention is to be understood as not limited in scope by any statements or theories set forth herein in explanation of the changes taking place but is to be considered as limited only by the claims attached hereto as part of this specification wherein it is our intention to claim all novelty inherent in our invention in view of the prior art.

What we claim is:

1. The process of manufacturing mercapto-benzo-thiazole which comprises heating together substantially equi-molecular proportions of thio-carbanilide, sulfur and carbon-bisulfid in a container mantained under the pressure developed by the gases and vapors evolved in the reaction and at a maximum temperature of approximately 275° C.

2. The process of manufacturing mercapto-benzo-thiazole which comprises heating together substantially equi-molecular proportions of thio-carbanilide, sulfur and carbon-bisulfid in a closed container while preventing the escape of gases therefrom whereby a pressure is developed within the container and continuing said heating at temperatures between 225 to 275° C. until a maximum pressure is developed in said container.

3. The process of manufacturing an aryl-mercapto-thiazole which comprises heating together to approximately 275° C. substantially equi-molecular proportions of an aryl substituted thio-urea, sulfur and carbon bisulfid under conditions whereby a maximum pressure is developed, continuing the heat treatment for a short period of time under said pressure conditions, releasing said pressure and recovering the aryl-mercapto-thiazole from the nongaseous reaction product so formed.

In testimony whereof we affix our signatures.

HAROLD P. ROBERTS.
HARRY A. MERKLE.